United States Patent [19]
Suzuki

[11] 3,970,164
[45] July 20, 1976

[54] SMALL-SIZED SNOWMOBILE

[75] Inventor: Keisuke Suzuki, Hamamatsu, Japan

[73] Assignee: Yamaha Hatsudoki Kabushiki Kaisha, Iwata, Japan

[22] Filed: Dec. 17, 1974

[21] Appl. No.: 533,527

[30] Foreign Application Priority Data
Dec. 17, 1973 Japan.......................... 48-144931[U]

[52] U.S. Cl.............................. 180/68 R; 180/69 C
[51] Int. Cl.².................... B60K 11/04; B62D 25/12
[58] Field of Search................ 180/68 R, 68 P, 5 R, 180/54 A, 69 C

[56] References Cited
UNITED STATES PATENTS

| | | | |
|---|---|---|---|
| 1,705,026 | 3/1929 | Muir | 180/68 R |
| 2,100,490 | 11/1937 | Rippingille | 180/54 A |
| 2,241,147 | 5/1941 | Maier | 180/68 R X |
| 2,250,795 | 7/1941 | Fitz Gerald et al. | 180/68 R |
| 3,572,813 | 3/1971 | Takada | 180/5 R |
| 3,688,856 | 9/1972 | Boehm et al. | 180/5 R |
| 3,819,000 | 6/1974 | Larsen | 180/54 A |
| 3,835,948 | 9/1974 | Duclo | 180/5 R |

Primary Examiner—M. H. Wood, Jr.
Assistant Examiner—Milton L. Smith

[57] ABSTRACT

A small-sized snowmobile has a water-cooled engine within an engine compartment and a cowl arranged above the engine to constitute the upper wall of the engine room and covering the engine. The cowl has an opening and a radiator is disposed flat in a manner to confront the opening. The radiator has a pair of tanks, a plurality of radiator tubes arranged between the tanks and each having a substantially oval cross section, and a plurality of radiator fins for facilitating a cooling of the radiator.

6 Claims, 4 Drawing Figures

SMALL-SIZED SNOWMOBILE

BACKGROUND OF THE INVENTION

This invention relates to a small-sized snowmobile and in particular to a small-sized snowmobile having a water-cooled engine for driving it.

A conventional small-sized snowmobile is mostly equipped with an air-cooled engine. However, the air-cooled engine has a poor cooling efficiency and a stable, uniform cooling is not obtained for each part of the engine. Furthermore, the air-cooled engine produces louder noises during the operation. In order to avoid such drawbacks inherent in the air-cooled engine, various attempts have been made to use a water-cooled engine in the small-sized snowmobile. The snowmobile has an engine compartment on the forward end portion whose side view provides a streamline configuration. It is therefore difficult to obtain a space sufficient to mount a radiator upright at the forward end portion of the engine compartment. For this reason, the conventional small-sized snowmobile has, for example, a radiator mounted upright at the rear portion of the engine or at the rear end portion of an engine compartment so as to take air from above and flow the air downward through the radiator. With the small-sized snowmobile of such type, however, air is taken from above the rear end portion of the engine compartment in a manner that air current is forcefully bent through air ducts. As a result, the radiator can not be sufficiently cooled due to a poor air flow efficiency. Furthermore, air resistance is undesirably involved.

SUMMARY OF THE INVENTION

An object of this invention is to provide a small-sized snowmobile having a radiator exposed direct to the atmosphere without having any air ducts, the arrangement of which enables, during the travelling, a sufficient amount of air current to be flowed through the radiator so as to provide a good cooling efficiency to an engine.

Another object of this invention is to provide a small-sized snowmobile having a radiator exposed direct to the atmosphere, the arrangement of which, even if no greater air current is produced as in the case where the snowmobile is travelled at low speeds or stopped, can provide a good cooling efficiency to an engine due to the snowmobile being generally used in the very cold atmosphere.

Another object of this invention is to provide a small-sized snowmobile having a radiator mounted in a manner to confront an opening of a cowl, the arrangement of which, even when the snowmobile is travelled deep on a newly fallen snow zone or it is travelled with sprays of snow scattered from under skis mounted on the forward end portion of the snowmobile, prevents the passage of air through the radiator from being blocked as encountered in a conventional snowmobile.

According to this invention, there is provided a small-sized snowmobile comprising a body, a water-cooled engine disposed within the forward end portion of the body, a cowl arranged above the engine and having a wide upper portion inclined toward the forward end of the snowmobile to define, together with the body, an engine room, said cowl having an opening in the wide upper portion, and a radiator disposed in a manner to permit the radiator to be exposed to the atmosphere through the opening and connected through radiator hoses to the engine.

With the small-sized snowmobile, the radiator may be mounted on the cowl so that they can be moved as a unit. Since the cowl is swung open with the radiator fitted thereon, no interference is made in effecting a repair or maintenance.

This invention will be further described by way of example with reference to the accompanying drawings.

DETAILED DESCRIPTION OF THE INVENTION

Figure 1:
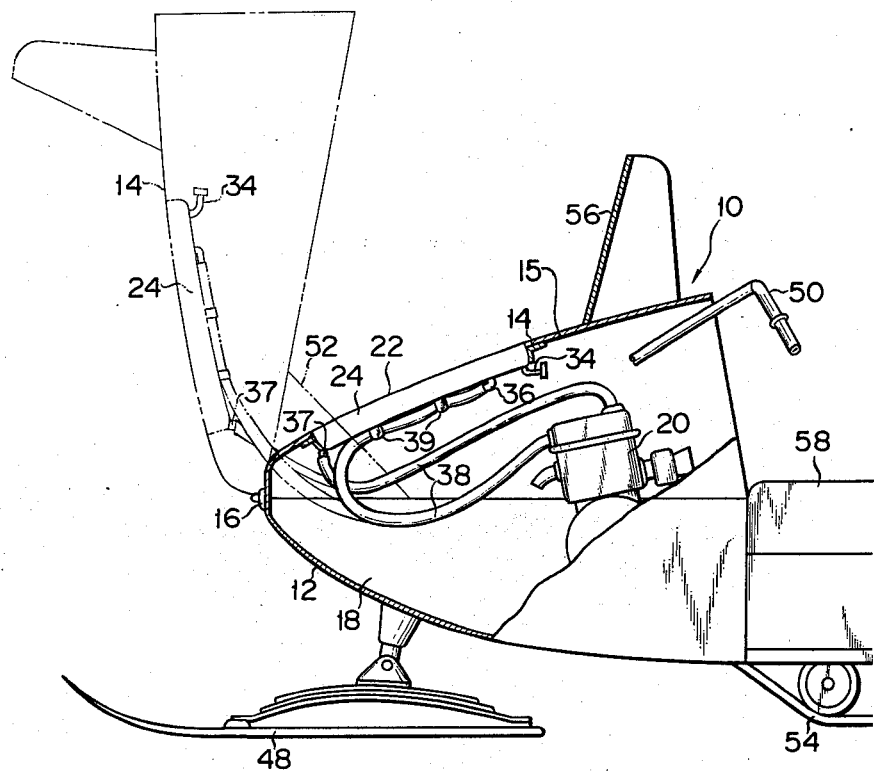
FIG. 1 is a partial side view, partly broken away, showing a small-sized snowmobile according to this invention.

As shown in FIG. 1 a small-sized snowmobile 10 has a body 12 and a cowl 14 swingably mounted on the body 12 by a hinge member 16 fitted on the forward end of the body 12. A water-cooled engine 20 is disposed within an engine compartment 18 so defined by the body 12 and the cowl 14 as to provide a streamline configuration as viewed from the side of the snowmobile. Since the cowl 14 is pivoted by the hinge member 16 to the forward end of the body 12, it can be swung in the forward direction of the snowmobile 10 with the hinge member 16 as a fulcrum. The upper portion of the cowl 14 has a wide surface which is inclined toward the forward end of the snowmobile and is somewhat bulged laterally of the snowmobile 10. In the central portion of the curved upper surface 15 of the cowl 14 is provided an opening 22. A radiator 24 is mounted on the cowl 14 in a manner to confront the opening 22 of the cowl 14 and is exposed direct to the atmosphere.

Figure 2:
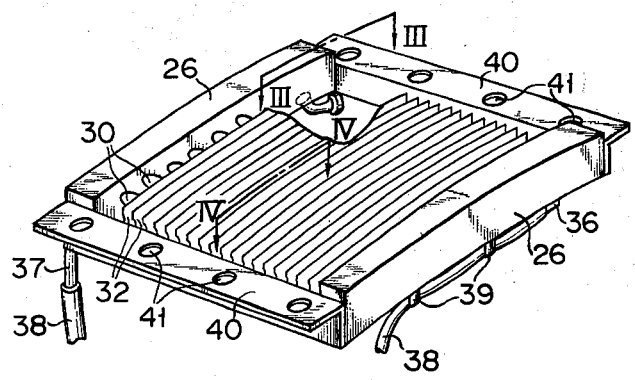
FIG. 2 is a schematic enlarged perspective view, partly broken away, showing a radiator of the snowmobile of FIG. 1.
Figure 4:
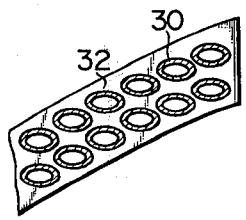
FIG. 4 is a partial enlarged cross-sectional view taken along line IV—IV of FIG. 2.

As shown in FIGS. 2 and 4 the radiator 24 has a pair of side tanks 26 each disposed along the direction of a central axis of the snowmobile 10, a plurality of radiator tubes 30 arranged between the side tanks 26, and a plurality of radiator fins 32, such as plate fins, adapted to facilitate cooling of a cooling medium.

Figure 3:
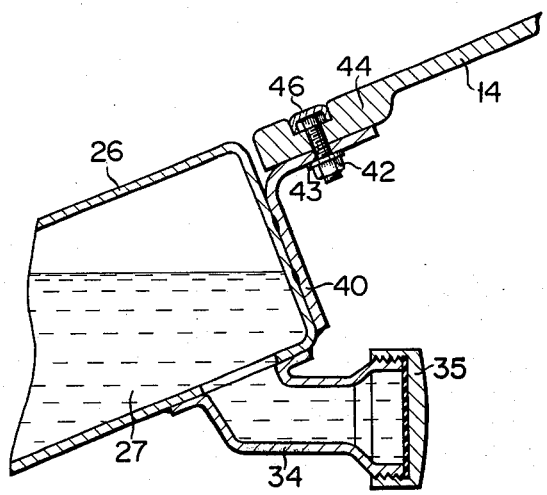
FIG. 3 is a partial enlarged cross-sectional view, taken on line III—III of FIG. 2, showing the manner in which a cowl is mounted on a radiator tank.

As shown in FIGS. 1 and 3, the side tank 26 has an inlet 34 for introducing the cooling medium, such as water, into the radiator 24. The inlet 34, when the cowl 14 is swung shut, extends rearwardly from below the rear end portion of the side tank 26 in a substantially parallel relation to the cowl 14 and is opened rearwardly of the rear end of the side tank 26. A cap 35 is fitted in a liquid-tight fashion over the inlet 34. One — hereinafter referred to as a first side tank — of said side tanks has a forwardly extending duct 36 mounted below near its rear end, while the other one — hereinafter referred to as a second side tank — of said side tanks has a downward extending duct 37 mounted below near its forward end. Over the forward end of the ducts 36 and 37 is fitted a radiator tube or hose 38 having one end mounted on the engine. The radiator hose 38 extending from the duct 36 which is mounted on the first side tank 26 is supported by a plurality of brackets 39 mounted on the first radiator tank 26 and extends along the lower surface of the first radiator tank 26 toward that neighborhood of the forward end of the first radiator tank 26 where it extends toward the engine. Though the inlet 34 is mounted only on the second side tank 26, it may be mounted on both the side tanks 26.

As shown in FIG. 3 a cooling medium 27 is substantially filled within the radiator 24. A mounting plate 40 L-shaped in cross-section is secured by welding to the forward and rear ends of the side tanks 26 in a manner to connect both the side tanks 26 together. A plurality of mounting holes 41 are provided at the upper section of the mounting plate 40. As shown in FIGS. 1 and 3, the radiator 24 is secured, by nuts 42 and bolts 43 associated with the holes 41, to the cowl in a manner that its one end surface is exposed direct to the atmosphere. A mounting portion 44 of the cowl 14 is made thicker than the remaining portion of the cowl 14 so that it can bear the weight of the radiator 24. The head of the bolt 43 is embedded in the cowl 14 so that it does not project from the outer surface of the cowl 14. A bolt cap 46 is fitted over the head of the bolt 43.

In FIG. 1, reference numeral 48 denotes steering skis; 50 a steering handle; 52 a chain for stopping the swinging movement of the cowl; 54 an endless belt; 56 a window shield and 58 a seat.

Though with the above-mentioned embodiment the radiator tanks 26 are arranged along the longitudinal direction of the snowmobile, it may be arranged along the lateral direction of the snowmobile. The above-mentioned positional relation such as "above and below" or "forward and rearward" are given by the relative position of the snowmobile as indicated by solid lines in FIG. 1.

In order to prevent the passage of air through the radiator from being blocked when snowmobile is travelled deep on a newly fallen snow zone or it is travelled with sprays of snow scattered from under skis mounted on the forward end portion of the snowmobile, the snowmobile according to this invention has such an arrangement that air current flowing along the surface of the cowl 14 flows through the opening 22 into the engine compartment 18. In the case, the air current is contacted with the radiator tubes 30 and radiator fins 32, thereby cooling the cooling medium. Since the radiator is exposed direct to the atmosphere, it is not subjected to any air flow resistance as encountered in a case where air ducts are used, and, in consequence, the radiator is sufficiently cooled by a greater amount of air. In an attempt to elevate a cooling efficiency through a passage of a larger amount of air, it is preferred that the radiator tube 30 have an oval cross section and be so arranged that projected area thereof as viewed from the front of the snowmobile 10 is substantially minimal. The radiator tubes 30 should be preferably overlappingly arranged with respect to each other, as viewed from above the snowmobile 10, so as to prevent falling snowflakes from entering direct into the engine compartment 18 when the snowmobile is stopped. The cowl 14 is made of synthetic resin such as reinforced plastic fiber resin, so it is inexpensive and light in weight.

Since the cowl 14 can be swingably mounted by the hinge member 16 on the body 12, if it is swung open as indicated by chain dot lines in FIG. 1, the radiator is moved, together with the cowl, away from the engine compartment. As a result, a maintenance or repair of the engine etc. within the engine compartment 18 can be easily effected. Since the open end of the inlet 34 of the tank 26 is, when the cowl is being shut, positioned rearwardly of the rear end of the radiator, it is positioned above the rear end of the radiator when the cowl is swung open, permitting a cooling medium to be easily replenished.

The cooling medium filled radiator can be adequately supported, as the cowl is made thicker around the opening as shown in FIG. 3.

Since the radiator hoses of the first and second side tanks extend, with a slight sagging left, into close proximity to the hinge 16, when the cowl is swung open, the respective radiator hoses are somewhat pulled taut so that just a proper length is given.

As mentioned above, the small-sized snowmobile has a radiator mounted on the cowl in a manner to confront the opening provided in the cowl which is arranged above the engine and covers the engine compartment, the arrangement of which not only permits a greater amount of air current to be passed through the radiator during the travelling of the snowmobile so as to obtain a good cooling efficiency, but also enables a good cooling efficiency to be maintained, since the passage of air through the radiator is not blocked even when the snowmobile is travelled deep on a newly fallen snow field or it is travelled with sprays of snow spread from under the steering skis mounted on the forward end portion of the snowmobile.

Since the cowl is swingably mounted on the forward end of the body in a manner that the radiator is mounted direct on the cowl, when the cowl is swung open, the radiator is moved, together with the cowl, away from the engine compartment, and in consequence a repair or maintenance of engine etc. within the engine room can be easily effected.

A cooling medium can be easily filled through the inlet into the radiator, as the inlet is positioned above the rear end of the radiator when the cowl is swung open.

It should be understood that the above-mentioned embodiment is intended to be illustrative only and not limitative in any way. Many changes or modifications may be resorted to without departing from the spirit and scope of this invention.

What is claimed is:

1. A small-sized snowmobile comprising a body, a water-cooled engine disposed within the forward end portion of the body, a cowl made of synthetic resin and including a wide upper portion inclined toward the forward end of the snowmobile to define, together with the body, an engine compartment, said wide upper portion of said cowl having an opening and a mounting portion at the marginal edge portion of the opening, and a radiator disposed in a manner to incline toward the forward end of the snowmobile and to permit the radiator to be directly exposed to the atmosphere through said opening and supported by the mounting portion, the front end of said cowl being swingably mounted on the body by means of a hinge, whereby said cowl and said radiator may be disposed to expose or cover said engine compartment.

2. A snowmobile according to claim 1, in which said radiator includes a pair of side tanks, positioned on two opposite sides of the radiator, at least one of which has an inlet for a cooling medium which is disposed above the rear end of the radiator when the cowl is in an open position.

3. A snowmobile according to claim 1, in which said hinge is arranged at the forward end portion of the body so as to permit the cowl to be opened forwardly and upwardly and said radiator includes a pair of side tanks, positioned on two opposite sides of the radiator, at least one of which has an inlet for a cooling medium, said inlet being disposed at the rear end of the radiator so that it can be disposed above the rear end of the radiator when the cowl is in the open position.

4. A snowmobile according to claim 3, in which said radiator includes a pair of side tanks and a plurality of radiator tubes, each substantially oval in cross section, and situated between the side tanks, said radiator tubes being so disposed that they overlap each other when viewed from above the snowmobile.

5. A snowmobile according to claim 1, in which said radiator includes a pair of side tanks and a plurality of radiator tubes, each substantially oval in cross section, and situated between the side tanks, said radiator tubes being so disposed that they overlap each other when viewed from above the snowmobile.

6. A snowmobile according to claim 1, in which said mounting portion is made thicker than the remaining portion of the wide upper portion of the cowl for reinforcing purposes.

\* \* \* \* \*